United States Patent
Nakayama et al.

(10) Patent No.: US 11,410,470 B2
(45) Date of Patent: Aug. 9, 2022

(54) CHARGING SYSTEM, ONBOARD SYSTEM, CHARGING METHOD, AND PROGRAM

(71) Applicant: MITSUBISHI HEAVY INDUSTRIES MACHINERY SYSTEMS, LTD., Kobe (JP)

(72) Inventors: Hiroyuki Nakayama, Tokyo (JP); Kenta Nakao, Tokyo (JP); Takaaki Sunagawa, Kobe (JP); Koichi Kanehara, Kobe (JP)

(73) Assignee: MITSUBISHI HEAVY INDUSTRIES MACHINERY SYSTEMS, LTD., Hyogo (JP)

(*) Notice: Subject to any disclaimer, the term of this patent is extended or adjusted under 35 U.S.C. 154(b) by 370 days.

(21) Appl. No.: 16/476,883

(22) PCT Filed: Feb. 14, 2017

(86) PCT No.: PCT/JP2017/005323
§ 371 (c)(1),
(2) Date: Jul. 10, 2019

(87) PCT Pub. No.: WO2018/150463
PCT Pub. Date: Aug. 23, 2018

(65) Prior Publication Data
US 2019/0340842 A1    Nov. 7, 2019

(51) Int. Cl.
*G07B 15/06*    (2011.01)
*G01G 19/03*    (2006.01)

(52) U.S. Cl.
CPC ............. *G07B 15/06* (2013.01); *G01G 19/03* (2013.01)

(58) Field of Classification Search
CPC ...... G01G 19/024; G01G 19/03; G07B 15/06; G07B 15/063
See application file for complete search history.

(56) References Cited

U.S. PATENT DOCUMENTS

| 10,473,515 B2* | 11/2019 | Imagawa | G01B 11/14 |
| 2002/0105440 A1* | 8/2002 | Bostrom | G08G 1/017 |
| | | | 340/928 |

(Continued)

FOREIGN PATENT DOCUMENTS

| JP | 59130168 U | 9/1984 |
| JP | S62224876 A | 10/1987 |

(Continued)

OTHER PUBLICATIONS

International Search Report and Written Opinion for International Application No. PCT/JP2017/005323 dated May 23, 2017; 13pp.

*Primary Examiner* — Natalie Huls
(74) *Attorney, Agent, or Firm* — Kanesaka Berner and Partners LLP (57) ABSTRACT

Provided is a charging system including: an axle load meter disposed on a lane and configured to measure an axle load of each of a plurality of axles of a vehicle traveling on the axle load meter; an acceleration information acquisition unit configured to acquire, from the vehicle, vertical-direction acceleration information associated with each of the axles; a correction calculation unit configured to calculate a corrected axle load for each of the axles by correcting, based on the vertical-direction acceleration information, a measurement result for each of the axles obtained by the axle load meter; and a toll determination unit configured to determine a toll for the vehicle based on the corrected axle load for each of the axles.

3 Claims, 8 Drawing Sheets

(56) References Cited

U.S. PATENT DOCUMENTS

| | | | |
|---|---|---|---|
| 2007/0179735 A1* | 8/2007 | Fiedler | G01C 21/16 702/150 |
| 2008/0136676 A1* | 6/2008 | Yano | G01G 19/02 340/937 |
| 2011/0172877 A1* | 7/2011 | Dourra | F16H 59/66 701/33.4 |
| 2011/0267200 A1* | 11/2011 | Reynolds | G01G 23/3742 340/666 |
| 2013/0220709 A1* | 8/2013 | Trakhimovich | G01G 19/024 177/134 |
| 2019/0212223 A1* | 7/2019 | Kusaka | G01B 11/16 |
| 2021/0231533 A1* | 7/2021 | Kawauchi | G01P 15/00 |

FOREIGN PATENT DOCUMENTS

| | | | |
|---|---|---|---|
| JP | H08313331 A | | 11/1996 |
| JP | 2001050801 A | | 2/2001 |
| JP | 2001133314 A | | 5/2001 |
| JP | 2003028700 A | | 1/2003 |
| JP | 2005092283 A | | 4/2005 |
| JP | 2008039489 A | * | 2/2008 |

* cited by examiner

CHARGING SYSTEM, ONBOARD SYSTEM, CHARGING METHOD, AND PROGRAM

RELATED APPLICATIONS

The present application is a National Phase of International Application Number PCT/JP2017/005323 filed Feb. 14, 2017.

TECHNICAL FIELD

The present invention relates to a charging system, an onboard system, a charging method, and a program.

BACKGROUND ART

Today, as the charging systems for use in toll roads such as expressways, the following two methods are known: a charging method based on vehicle-type discrimination (i.e., the fare (toll) being varied in accordance with the vehicle-type classification); and a charging method based on the weight (i.e., the toll being varied in accordance with the vehicle's weight).

Patent Documents 1 and 2 disclose axle load measuring instruments each of which is configured to monitor the load weight that is being carried on each vehicle by placing an axle load meter on the lane and measuring the axle loads of the vehicle traveling over the meter.

CITATION LIST

Patent Documents

Patent Document 1: JP 2001-050801 A
Patent Document 2: JP 2003-028700 A

SUMMARY OF INVENTION

Problem to be Solved by the Invention

An axle load measuring instrument such as ones disclosed in Patent Document 1 and Patent Document 2 is configured to monitor the load weight being carried on the traveling vehicle by measuring the axle loads by taking account of the vibrations of the traveling vehicle. The measurement result obtained by such an axle load measuring instrument, however, has not been used in the toll determination by the charging method based on the weight.

Hence, even though it is possible to measure the axle load with reduced influence of the acceleration, the vibrations, and the like of the traveling vehicle, no charging method based on the weight has dared to acquire any axle-load measurement result with such reduced influence.

Accordingly, the present invention provides a charging system configured to acquire the result of axle-load measurement with reduced influence of the acceleration, the vibrations, and the like of the traveling vehicle.

Solution to Problem

A charging system (1, 100) according to an aspect of the present invention includes: an axle load meter (60) disposed on a lane and configured to measure an axle load of each of a plurality of axles of a vehicle traveling on the axle load meter; an acceleration information acquisition unit (40C) configured to acquire, from the vehicle, vertical-direction acceleration information associated with each of the axles; a correction calculation unit (40D) configured to calculate a corrected axle load for each of the axles by correcting, based on the vertical-direction acceleration information, a measurement result for each of the axles obtained by the axle load meter; and a toll determination unit (51C, 151C) configured to determine a toll for the vehicle based on the corrected axle load for each of the axles.

According to this aspect, the charging system is configured to determine the toll for each vehicle based on the axle-load measurement result of each of the axles of the vehicle. Hence, the toll for each vehicle is determined based on the load on individual axles of the vehicle. Accordingly, in a case where more than one vehicle with the same total weight have different numbers of axles or have different load balances between their front and rear axles, different tolls can be charged on the vehicles.

In addition, the charging system is configured to correct the axle load in accordance with the vertical acceleration of each axle. Hence, the charging system can determine the toll of each vehicle based on the axle-load measurement result with reduced influence of the vertical acceleration of each axle derived from the acceleration, the vibrations, and the like of the traveling vehicle.

A charging system according to an aspect of the present invention further includes an acceleration-information request unit (40B) configured to transmit, to the vehicle, a request signal for the acceleration information in response to acquisition of the measurement result obtained by the axle load meter. In the charging system, the acceleration information acquisition unit is configured to acquire the acceleration information provided by the vehicle in response to the request signal.

According to this aspect, the charging system is configured to acquire acceleration information from the vehicle every time an axle-load measurement is performed. Hence, the charging system can acquire the acceleration information corresponding, on a one-to-one basis, to each of the axles whose axle loads are measured.

A charging system according to an aspect of the present invention further includes an axle-load-information calculation unit (51B, 151B) configured to calculate a representative value of the corrected axle loads for the individual axles.

According to this aspect, the charging system can charge, on each vehicle, a toll associated with the representative value of the corrected axle loads of all the axles of the vehicle. As the magnitude of the impact given by each vehicle to the road damage is associated with the representative value of all the axle loads of the vehicle (including its load), the charging system can charge a toll on each vehicle in accordance with the magnitude of the impact given by the vehicle to the road damage.

In a charging system according to an aspect of the present invention, the representative value is any one of a greatest value and an average value of the corrected axle loads of the individual axles.

According to this aspect, the charging system is configured to determine a toll that is associated with the greatest value of all the corrected axle loads of each vehicle. Hence, even if more than one vehicles have the same total weight, a toll that is associated with the local maximum axle load of each of such vehicles can be charged on each vehicle.

In addition, according to this aspect, the charging system is configured to determine a toll that is associated with the average value of all the corrected axle loads of each vehicle. Hence, even if more than one vehicle have the same total weight, a toll that is associated with the number of the axles of each of such vehicles can be charged on each vehicle.

A charging system according to an aspect of the present invention further includes an axle-load-information calculation unit (51B, 151B) configured to calculate a sum of the corrected axle loads for the individual axles.

According to this aspect, as the charging system is configured to determine, for each vehicle, a toll that is associated with the sum of all the corrected axle loads of the vehicle, a toll that is associated with the total weight of the vehicle can be charged on the vehicle. As the magnitude of the impact given by each vehicle to the road damage is associated with the total weight of each vehicle, a toll that depends on the magnitude of the impact given by the vehicle to the road damage can be charged on the vehicle.

An onboard system according to an aspect of the present invention includes: an accelerometer (31, 31') configured to measure vertical-direction acceleration information associated with each of the axles; and an acceleration information transmission unit (30C) configured to provide the vertical-direction acceleration information in response to a request signal transmitted in response to acquisition of a measurement result for each of axles obtained by an axle load meter disposed on a lane.

According to this aspect, the onboard system provides the acquired information on the acceleration in the vertical directions associated with each axle. Hence, the onboard system can cause the toll of each vehicle to be determined based on the axle-load measurement result with reduced influence of the vertical acceleration derived from the acceleration, the vibrations, and the like of the traveling vehicle.

A charging method according to an aspect of the present invention includes the steps of: measuring, by means of an axle load meter disposed on a lane, an axle load of each of a plurality of axles of a vehicle traveling on the axle load meter; acquiring, from the vehicle, vertical-direction acceleration information associated with each of the axles; calculating a corrected axle load for each of the axles by correcting, based on the vertical-direction acceleration information, a measurement result for each of the axles obtained by the axle load meter; and determining a toll for the vehicle based on the corrected axle load for each of the axles.

A program according to an aspect of the present invention is executable to cause a computer of a charging system including an axle load meter disposed on a lane and configured to measure an axle load of each of a plurality of axles of a vehicle traveling on the axle load meter to function as: an acceleration information acquisition unit (40C) configured to acquire, from the vehicle, vertical-direction acceleration information associated with each of the axles; and a correction calculation unit (40D) configured to calculate a corrected axle load for each of the axles by correcting, based on the vertical-direction acceleration information, a measurement result for each of the axles obtained by the axle load meter.

Advantageous Effect of Invention

The charging system according to an aspect of the present invention helps acquire the result of an axle-load measurement with reduced influence of the acceleration, the vibrations, and the like of the traveling vehicle.

DESCRIPTION OF EMBODIMENTS

Embodiments of the present invention are described below with reference to the accompanying drawings.

First Embodiment

A first embodiment of a charging system and an onboard system of the present invention will be described below with reference to FIG. 1 to FIG. 6.

Overall Configuration

An overall configuration of a charging system 1 will be described below.

Figure 1:
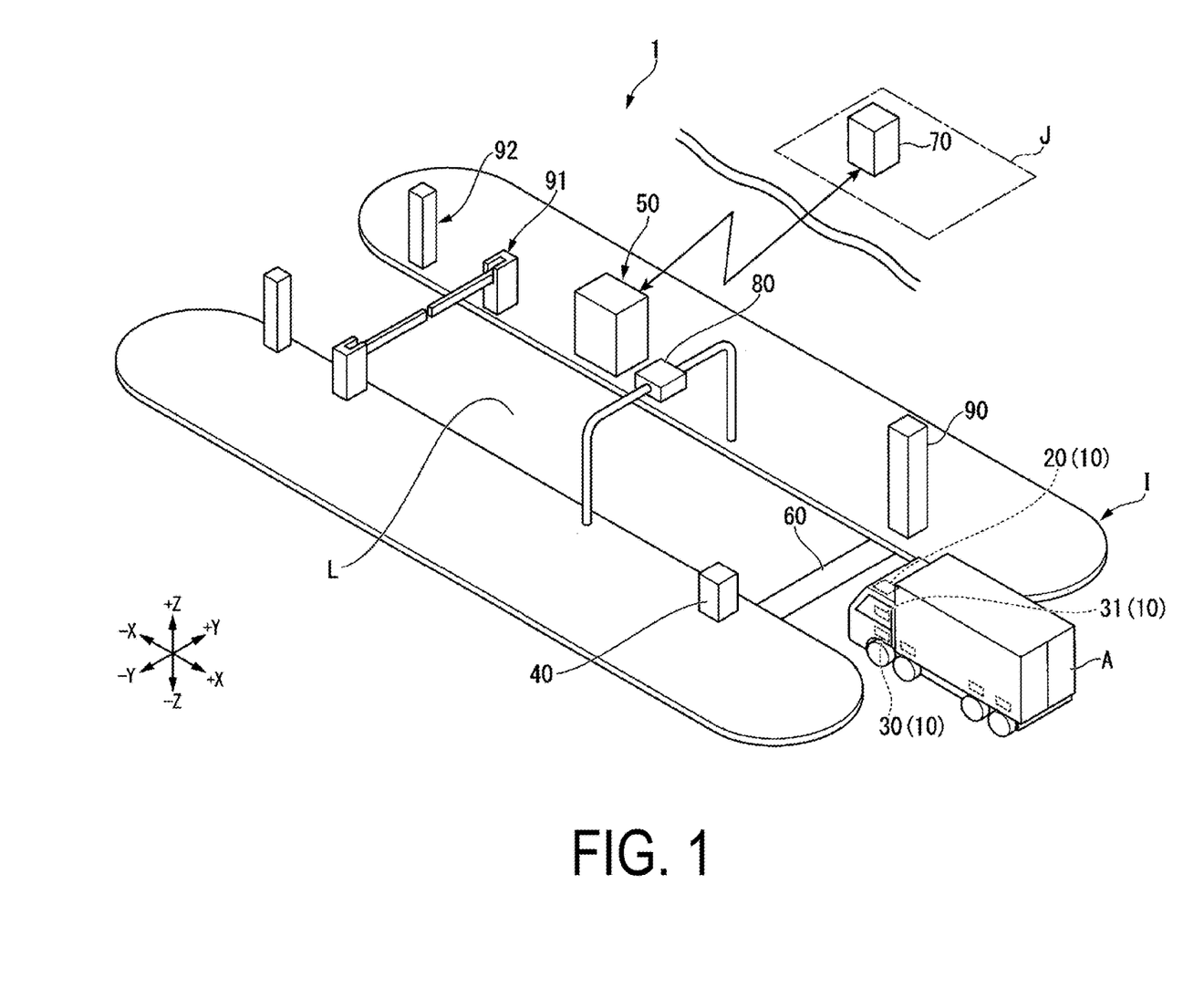
FIG. 1 is a schematic diagram of a first embodiment of the present invention.

As illustrated in FIG. 1, the charging system 1 is a facility disposed at an exit tollgate (at an entry tollgate in some pricing forms) of an expressway that is a toll road, and is configured to collect a toll amount associated with a vehicle A in which a user of the expressway is traveling.

In the charging system 1 disposed in the exit tollgate, the vehicle A is traveling on a lane L that is designed to lead vehicles from the expressway to a general road. Islands I are constructed on the two sides of the lane L, and various apparatuses included in the charging system 1 are installed in the islands I.

Hereinafter, the direction in which the lane L extends (i.e., the ±X directions in FIG. 1) is referred to as the "lane direction." In addition, in the lane direction, the expressway side (i.e., the +X direction side in FIG. 1) of the lane L is referred to as the "upstream side." In addition, in the lane direction, the general road side of the lane L (i.e., the −X direction side in FIG. 1) is referred to as the "downstream side."

In addition, the direction corresponding to the width of the lane L is referred to as the "lane width direction (i.e., the ±Y directions in FIG. 1), and the direction corresponding to the vehicle height of the vehicle A is referred to as the "vertical direction (i.e., the ±Z directions in FIG. 1).

Figure 2:
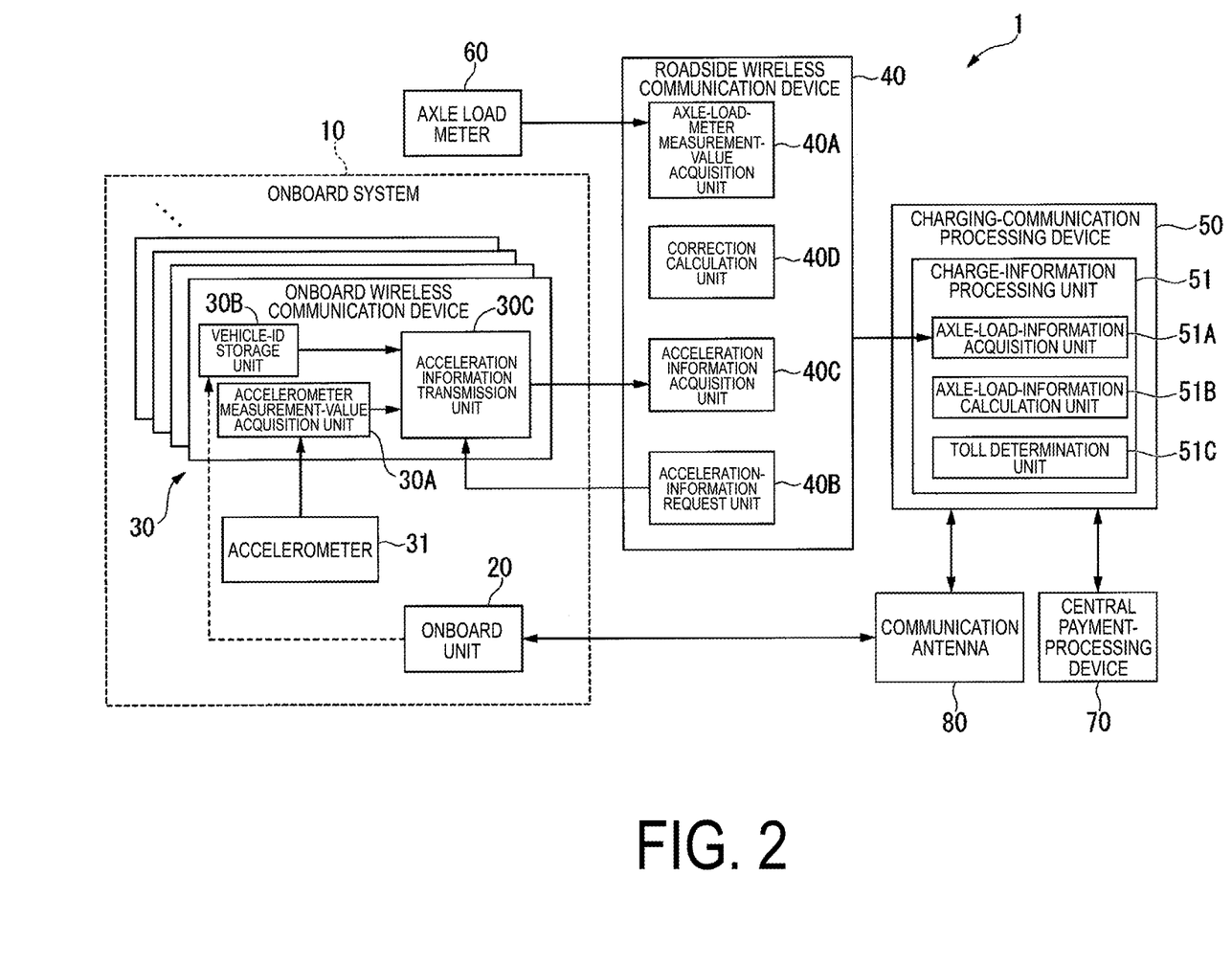
FIG. 2 is a block diagram of the first embodiment of the present invention.

As illustrated in FIG. 1 and FIG. 2, the charging system 1 includes a roadside wireless communication device 40, a charging-communication processing device 50, an axle load meter 60, and a communication antenna 80. The charging system 1 is configured to perform a charging processing by means of a wireless communication system (Electronic Toll Collection System=ETC (trade name), RFID, etc.). In addition, the charging system 1 further includes an entry-side vehicle detector 90, a departure controller 91, and a departure-side vehicle detector 92.

In the present embodiment, the devices included in the charging system 1, namely the entry-side vehicle detector 90, the roadside wireless communication device 40, the communication antenna 80, the charging-communication processing device 50, the departure controller 91, and the departure-side vehicle detector 92, are arranged in this order from the upstream side to the downstream side on a roadside.

The axle load meter 60 is disposed on the lane L. In the lane direction (i.e., the ±X directions), the axle load meter 60 is disposed substantially at the same position as the entry-side vehicle detector 90.

An onboard system 10 is mounted in the vehicle A traveling on the lane L. The onboard system 10 is configured to perform a wireless communication processing (hereinafter, simply referred to as the "wireless communications") with the roadside wireless communication device 40, and thus transmit acceleration information and a vehicle ID of the vehicle A (which are to be described later) to the roadside wireless communication device 40.

The onboard system 10 includes an onboard unit 20, a plurality of onboard wireless communication devices 30, and an accelerometer 31.

The roadside wireless communication device 40 is disposed on the island I at a position near the axle load meter 60. The roadside wireless communication device 40 is configured to receive the acceleration information and the vehicle ID of the vehicle A (which will be described later) from the onboard system 10.

In the present embodiment, the roadside wireless communication device 40 is disposed at a position slightly downstream side of the axle load meter 60. However, as long as the roadside wireless communication device 40 has enough time or covers a wide enough communication area to communicate with the onboard system 10, the roadside wireless communication device 40 may be at any position, in the lane direction, relative to the axle load meter 60. For example, the roadside wireless communication device may be disposed at the same position in the lane direction as that of the axle load meter 60.

As will be described later, the roadside wireless communication device 40 is configured to acquire, from the axle load meter 60, a measurement value of the axle load of each axle, and to acquire acceleration information from the onboard system 10. In addition, the roadside wireless communication device 40 is configured to correct, based on the acceleration information thus acquired, the measurement result of each axle obtained by the axle load meter, and then transmit the corrected value to the charging-communication processing device 50.

The charging-communication processing device 50 is a processing unit configured to execute a series of charging processes performed by the charging system 1. In the present embodiment, the charging-communication processing device 50 includes a charge-information processing unit 51. The charge-information processing unit 51 includes an axle-load-information acquisition unit 51A, an axle-load-information calculation unit 51B, and a toll determination unit 51C.

In the present embodiment, executing the program that is to be described later makes a computer function as the axle-load-information acquisition unit 51A, the axle-load-information calculation unit 51B, and the toll determination unit 51C.

The charging-communication processing device 50 is configured to receive, from the roadside wireless communication device 40 through a wired or wireless communication, axle-load information corrected based on the acceleration information of the vehicle A traveling on the lane L. In addition, the charging-communication processing device 50 is configured to acquire, from the onboard unit 20 through the communication antenna 80, the vehicle-type classification, which is a piece of information on the vehicle details (to be described later) and which is registered in the onboard unit 20. Of those pieces of axle-load information corrected based on the acquired vehicle-type classification and the acquired acceleration information, the charging-communication processing device 50 may use only the axle-load information corrected based on the acceleration information and thus employ a charging method based on the weight, where tolls associated with individual vehicles' axle information are charged. In addition, the charging-communication processing device 50 may use the axle-load information corrected based on both the vehicle-type classification and the acceleration information and thus employ a combined charging method of both a charging method based on the vehicle-type classification and a charging method based on the weight, where tolls associated with axle-load information corrected based on both the vehicle-type classification and the acceleration information.

As illustrated in FIG. 1 and FIG. 2, the charging-communication processing device 50 is configured to output the acquired information, the charging-processing results, and the like to a central payment-processing device 70 (host device) located in a remote place J.

The axle load meter 60 extends along the lane width directions on the road surface of the lane L. In the present embodiment, the axle load meter 60 is buried in the road surface of the lane L. The axle load meter 60 is configured to measure the load of each axle (also referred simply to as the "axle load") of the vehicle A when the vehicle A moving in a lane direction on the lane L travels on the axle load meter 60.

Figure 3:
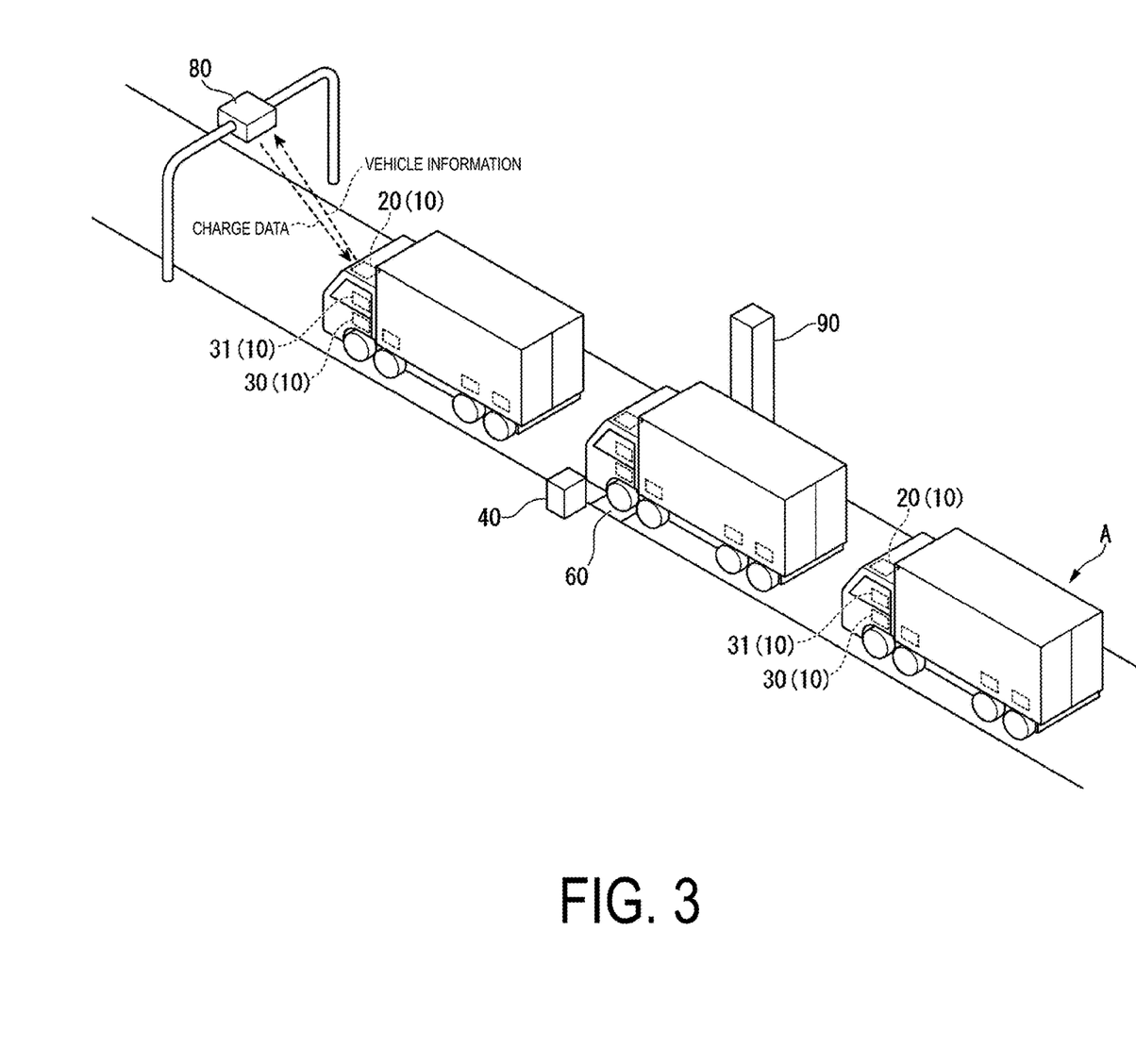
FIG. 3 is a diagram describing details of the first embodiment of the present invention.

As illustrated in FIG. 2 and FIG. 3, the communication antenna 80 communicates wirelessly with the onboard unit 20 mounted in the vehicle A. Specifically, the communication antenna 80 is configured to transmit and receive electromagnetic waves at a predetermined frequency (e.g., approximately 5.8 GHz), and to communicate wirelessly with the onboard unit 20 mounted in the incoming vehicle A by use of the electromagnetic waves.

In the present embodiment, as illustrated in FIG. 3, the communication antenna 80 is configured to receive the information on the vehicle details (the number of axles, the number of wheels per axle, the vehicle ID, the vehicle-type classification, the card information, the entry-gate information, and the like) from the onboard unit 20 of the vehicle A passing through the tollgate. In addition, the communication antenna 80 is configured to transmit the charge data including the result of the charge processing to the onboard unit 20 of the vehicle A passing through the tollgate.

The entry-side vehicle detector 90 is disposed on the island I, and is configured to emit and receive light beams to and from the lane L in the lane width direction (i.e., in the ±Y directions) to detect whether there is a vehicle A (vehicle body) traveling on the lane L. The vehicle entry-side vehicle detector 90 is thus configured to detect the passing of one vehicle A through a predetermined position (or the entry of one vehicle A into the predetermined position) to generate vehicle-passing information.

The departure controller 91 is disposed on the downstream side over the lane L, and is configured to control the departure of the vehicle A traveling on the lane L. For example, the departure controller 91 is configured to close the lane L to prevent the exit of a particular vehicle A from the tollgate in a case where the charging processing for the particular vehicle A has not been completed normally. In addition, the departure controller 91 is configured to open the lane L in a case where the charging processing for a particular vehicle A has been completed normally.

The departure-side vehicle detector 92 is disposed at the remotest position on the downstream side of the lane L, and is configured to detect the exit of the vehicle A from the charging system 1.

Onboard System

Detailed description will be provided below about some components of the onboard system 10 and their functions.

A vehicle A that has a plurality of axles includes an onboard unit 20, an accelerometer 31, and a plurality of onboard wireless communication devices 30. As illustrated in FIG. 3, in the present embodiment, the vehicle A includes one onboard unit 20 and one accelerometer 31. In addition, the vehicle A includes the same number of onboard wireless communication devices 30 as the number of the axles of the vehicle A. In the case illustrated in FIG. 3, as the number of axles of the vehicle A is four, the vehicle A includes four onboard wireless communication devices 30. Each of the onboard wireless communication devices 30 is associated with and disposed near the corresponding one of the axles of the vehicle A.

The onboard unit 20 is configured to transmit information on the vehicle details to the communication antenna 80 approximately at the time when the vehicle A passes by the communication antenna 80.

In the present embodiment, as illustrated in FIG. 1, the communication antenna 80 is disposed at a position on the downstream side of the roadside wireless communication device 40. Hence, the onboard system 10 is configured to transmit the information on the vehicle details to the communication antenna 80 after transmitting the vehicle ID and the acceleration information to the roadside wireless communication device 40.

Each of the onboard wireless communication devices 30 includes an accelerometer measurement-value acquisition unit 30A, a vehicle-ID storage unit 30B, and an acceleration information transmission unit 30C. As will be described later, each of the onboard wireless communication devices 30 is configured to communicate wirelessly at short range with the roadside wireless communication device 40.

The vehicle-ID storage unit 30B is configured to store a vehicle ID given to each vehicle, and to output the stored vehicle ID to the acceleration information transmission unit 30C. In the present embodiment, the vehicle-ID storage unit 30B stores beforehand a vehicle ID that helps to differentiate the vehicle A from other vehicles (i.e., an vehicle ID unique to the vehicle A).

The vehicle-ID storage units 30B of all the onboard wireless communication devices 30 store the same vehicle ID unique to the vehicle A.

As a modified example, each vehicle-ID storage unit 30B may be configured to be internally communicable with the onboard unit 20 as indicated by the dashed-line arrow in FIG. 2 and thus to store the vehicle ID that has been notified of by the onboard unit 20.

Each of the acceleration information transmission units 30C is configured to acquire, through the corresponding accelerometer measurement-value acquisition unit 30A, a measurement value of the acceleration measured by the accelerometer 31, and is configured also to acquire the vehicle ID from the corresponding vehicle-ID storage unit 30B.

Each acceleration information transmission unit 30C is configured to intermittently acquire the measurement value of the acceleration, and to transmit (provide) such acceleration information to the roadside wireless communication device 40 at any time when the roadside wireless communication device 40 requests the acceleration information. In the present embodiment, the acceleration information transmission unit 30C is configured to add the vehicle ID to the acceleration information and then to transmit the acceleration information with the vehicle ID to the roadside wireless communication device 40.

Note that though the acceleration information transmission unit 30C is configured to acquire the measurement value of the acceleration, the acceleration information transmission unit 30C may acquire any analog signal and/or any digital signal as long as the signal to be acquired is acceleration information associated with the measured value.

Modified Example of Onboard System

Figure 4:
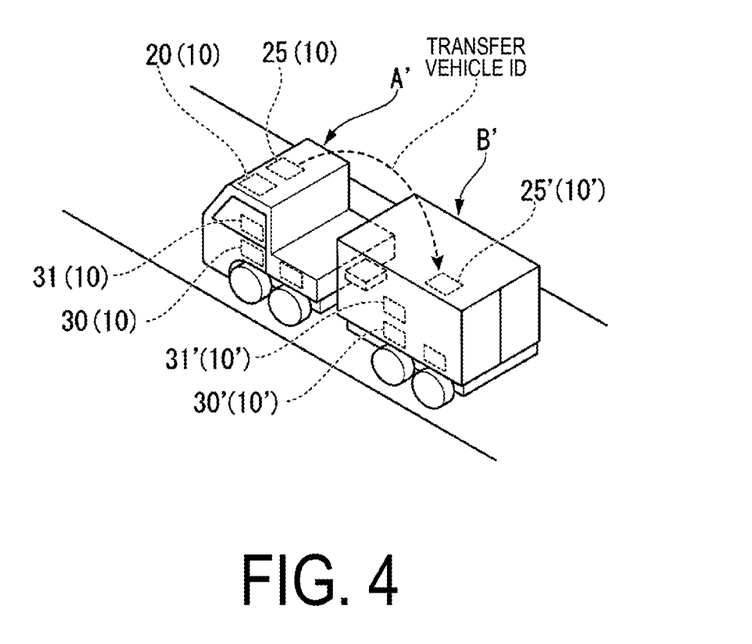
FIG. 4 is a diagram describing a modified example of the first embodiment of the present invention.

As a modified example, the onboard system may be configured as illustrated in FIG. 4. In the present modified example, there are two vehicles, which are a towing vehicle A' and a towed vehicle B'. In addition, an onboard system 10 is mounted in the towing vehicle A' whereas an auxiliary onboard system 10' is mounted in the towed vehicle B'.

As in the case of vehicle A, the onboard system 10 mounted in the towing vehicle A' includes an onboard unit 20, an accelerometer 31, and a plurality of onboard wireless communication devices 30. The onboard system 10 further includes a towing-vehicle-and-towed-vehicle communication unit 25. Each of the onboard wireless communication devices 30 is configured to transmit, to the roadside wireless communication device 40, a vehicle ID and acceleration information of the towing vehicle A'. The towing-vehicle-and-towed-vehicle communication unit 25 is configured to store the vehicle ID of the towing vehicle A'.

As in the case of the vehicle A, the auxiliary onboard system 10' mounted in the towed vehicle B' includes an accelerometer 31' and a plurality of onboard wireless communication devices 30'. The auxiliary onboard system 10' further includes an auxiliary towing-vehicle-and-towed-vehicle communication unit 25'.

In a case where the towing vehicle A' and the towed vehicle B' are coupled together to make the towing vehicle A' tow the towed vehicle B', the towing-vehicle-and-towed-vehicle communication unit 25 of the towing vehicle A' and the auxiliary towing-vehicle-and-towed-vehicle communication unit 25' of the towed vehicle B' are connected to each other by a wired or a wireless communication circuit. The vehicle ID of the towing vehicle A' stored in the towing-vehicle-and-towed-vehicle communication unit 25 is transmitted from the towing-vehicle-and-towed-vehicle communication unit 25 to the auxiliary towing-vehicle-and-towed-vehicle communication unit 25'. Once the transmitted vehicle ID of the towing vehicle A' has reached the auxiliary towing-vehicle-and-towed-vehicle communication unit 25', the vehicle ID is stored in each of the onboard wireless communication devices 30'. The onboard wireless communication device 30' transmits the transmitted vehicle ID and acceleration information of the towing vehicle A' to the roadside wireless communication device 40 when the onboard wireless communication device 30' receives the transmitted vehicle ID and acceleration information of the towing vehicle A'.

Hence, according to the present modified example, each of the onboard wireless communication devices 30' attached to their respective axles of the towed vehicle B' acquires the vehicle ID of the towing vehicle A'. Hence, the roadside wireless communication device 40 can recognize that the vehicle ID that belongs to the axles of the towed vehicle B' is the same vehicle ID that belongs to the axles of the towing vehicle A'.

Note that the onboard wireless communication devices 30' attached to their respective axles of the towed vehicle B' may acquire the vehicle ID of the towing vehicle A' at any time before the vehicles A' and B' pass by the roadside wireless communication device 40. For example, the acquisition may be performed when the towing vehicle A' and the towed vehicle B' are coupled together or after the towing vehicle A' that tows the towed vehicle B' starts traveling.

Roadside Wireless Communication Device

Detailed description will be provided below about some components of the roadside wireless communication device 40 and their functions.

As illustrated in FIG. 2, the roadside wireless communication device 40 functionally includes an axle-load-meter measurement-value acquisition unit 40A, an acceleration-information request unit 40B, an acceleration information acquisition unit 40C, and a correction calculation unit 40D.

In the present embodiment, the execution of a program (to be described later) allows a single computer to function as the axle-load-meter measurement-value acquisition unit 40A, the acceleration-information request unit 40B, the acceleration information acquisition unit 40C, and the correction calculation unit 40D.

The axle-load-meter measurement-value acquisition unit 40A is configured to acquire, from the axle load meter 60, the measurement value of the axle load of each of the axles of the vehicle A. Note that in the present embodiment, the measurement value of the axle load is acquired from the axle load meter 60, but any analog signal and/or any digital signal may be acquired as long as the information to be acquired is axle-load information associated with the measurement value.

The acceleration-information request unit 40B is configured to transmit an request signal to request the onboard system 10 for the acceleration information at the moment when the measurement value of the axle load of each axle is acquired in response to the acquisition of the measurement value of the axle load of each axle by the axle-load-meter measurement-value acquisition unit 40A. In the present embodiment, the moment the axle-load-meter measurement-value acquisition unit 40A acquires the measurement value of the axle load of each axle, the acceleration-information request unit 40B transmits a request signal to request the acceleration information to the acceleration information transmission unit 30C associated with each axle.

The measurement value of the axle load of each axle is acquired at the moment when the wheel associated with each of the axles of the vehicle A travels on the axle load meter 60. Hence, the acceleration-information request unit 40B requests the acceleration information from the acceleration information transmission unit 30C associated with each of the axles of the vehicle A at the moment when the wheel associated with the axle travels on the axle load meter 60.

The acceleration information acquisition unit 40C is configured to acquire, along with the associated vehicle ID, the acceleration information transmitted from each acceleration information transmission unit 30C in response to the request from the acceleration-information request unit 40B.

In the present embodiment, the roadside wireless communication device 40 and each of the onboard wireless communication devices 30 are configured to wirelessly communicate with each other at short range. Hence, of those onboard wireless communication devices 30 that are disposed near their respective axles, only the onboard wireless communication device 30 disposed near the axle that has just passed by the roadside wireless communication device 40 can communicate with the roadside wireless communication device 40.

To put it differently, every time the axle load meter 60 measures the axle load of one axle that has just passed by of the vehicle A including a plurality of axles, the acceleration information acquisition unit 40C acquires the acceleration information from only the onboard wireless communication device 30 associated with that one axle that has just passed by among all the plurality of axles of the vehicle A.

The vertical-direction acceleration acting on the vehicle A may be changed by the acceleration or the deceleration of the vehicle A that takes place immediately before or while the vehicle A is passing on the axle load meter 60. Even with such changes, the latest acceleration information measured at the moment when each axle passes on the axle load meter 60 is transmitted, to the acceleration information acquisition unit 40C, as the information on the acceleration acting on the axle.

Note that the short range mentioned earlier as the communicable range between the roadside wireless communication device 40 and each onboard wireless communication device 30 is set, for example, at from 1 m to 1.5 m. The short range does not have to be the range from 1 m to 1.5 m mentioned above. Rather, any range may be settable as long as the roadside wireless communication device 40 can distinguish the onboard wireless communication device 30 of the communication target from the other onboard wireless communication devices 30.

The correction calculation unit 40D is configured to acquire the measurement value of the axle load of each axle through the axle-load-meter measurement-value acquisition unit 40A, and also acquire, along with the associated vehicle ID, the acceleration information through the acceleration information acquisition unit 40C at the moment when the axle load of each axle is measured.

The correction calculation unit 40D is configured also to correct the acquired measurement value of the axle load of each axle by use of the acceleration information at the moment of the axle-load measurement, and thus to convert the axle loads measured for the traveling vehicle A to the static loads associated with individual axles. The roadside wireless communication device 40 is configured to transmit, to the charging-communication processing device 50, each of the static loads obtained by the conversion as the corrected axle load of each axle.

Figure 5:
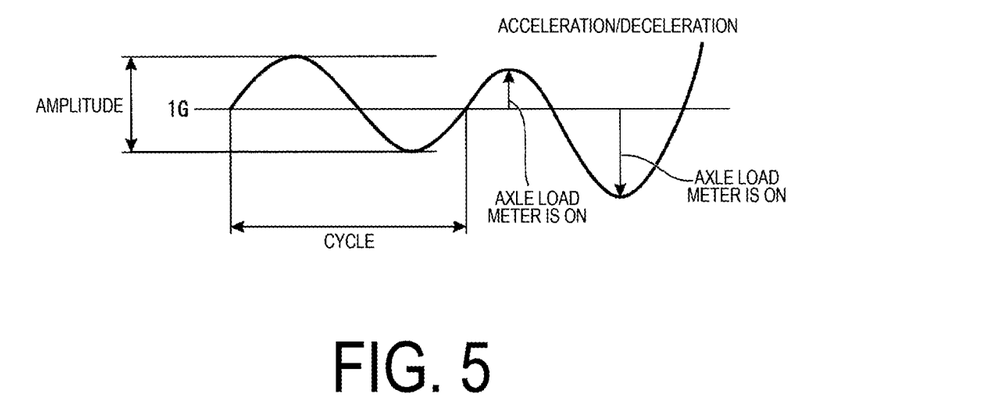
FIG. 5 is a graph describing acceleration measurement of the first embodiment of the present invention.

As illustrated in FIG. 5, the traveling vehicle A vibrates with accelerations in the vertical direction. Hence, the load measured by the axle load meter 60 is not the static load (i.e., a load measured in a state where there are no vertical vibrations) but a load with fluctuations associated with vertical-direction accelerations (i.e., a dynamic load). In FIG. 5, the horizontal axis represents the time and the vertical axis represents the acceleration, in the vertical direction, of the vehicle A.

In a state where the vehicle A is not moving, the accelerometer 31 of the present embodiment indicates 1 G ($\approx 9.8$ m/s$^2$) in the downward direction corresponding to the gravitational acceleration. For example, a value of 1 G is indicated in FIG. 5 as the center value of the amplitude of the vibration waveform.

In the present embodiment, the vibration waveform of the vertical-direction acceleration measured by the accelerometer 31 has a phase that coincides with the phase of the vibration waveform of the load measured by the axle load meter 60. For example, when the vertical-direction acceleration reaches its greatest value, the load measured by the axle load meter 60 also reaches its own greatest value. Likewise, when the vertical-direction acceleration reaches its smallest value, the load measured by the axle load meter 60 also reaches its own smallest value.

In addition, the load (dynamic load) measured by the axle load meter 60 is proportional to the vertical-direction acceleration measured by the accelerometer 31. For example, the dynamic load measured at the time when the vertical-direction acceleration is 2 G is twice as great as the static value, while dynamic load measured at the time when the vertical-direction acceleration is 0.5 G is half as great as the static load.

Hence, the correction calculation unit 40D is configured to acquire, from the accelerometer 31 through the onboard wireless communication device 30, the vertical-direction acceleration at the moment when the measurement by the axle load meter 60 is performed (when the axle load meter is ON) as illustrated in FIG. 5. Then, the correction calculation unit 40D divides, by the acquired acceleration, the load that the axle load meter 60 has measured, and thus converts the load measured by the axle load meter 60 to a static load.

For a case where the load measured by the axle load meter 60 is not proportional to the vertical-direction acceleration measured by the accelerometer 31, the correction calculation unit 40D may acquire beforehand the rate of variation in the static load caused by the vertical-direction accelerations of various amounts and may use a conversion formula and/or a conversion table to convert the measured load to a static load.

In addition, in a case where the phase of the vibration waveform of the vertical-direction acceleration measured by the accelerometer 31 does not coincide with the phase of the vibration waveform of the load measured by the axle load meter 60, the following method of conversion may be used.

Firstly, the accelerometer 31 is made to measure constantly the vertical-direction acceleration of the traveling vehicle A to acquire the vibration information (the cycle and/or the amplitude) about the acceleration of the vehicle A as illustrated in FIG. 5. Then, the accelerometer 31 outputs, to the correction calculation unit 40D through the onboard wireless communication device 30, not only the vibration information but also the phase of the acceleration cycle and the phase of the vibration cycle (i.e., where in a cycle the point in question corresponds) at the moment when the corresponding wheel is traveling on the axle load meter 60.

On the other hand, the correction calculation unit 40D acquires beforehand the rate of variation in the static load for each acceleration and each phase in various vibration states (in the vibration waveform).

Hence, based on the vibration information acquired through the onboard wireless communication device 30 and on the acceleration and the phase at the moment when the wheel in question is traveling on the axle load meter 60, the correction calculation unit 40D identifies the relevant rate of variation and converts the measured load to a static load.

Note, however, that in a case where the two phases do not coincide with each other, and in addition, where the accelerometer 31 detects, as the acceleration at the moment when the wheel in question is traveling on the axle load meter 60, an acceleration that is different from the one in a steady traveling state as indicated by the vibrations illustrated in the second half of the graph in FIG. 5 (in a case of acceleration/deceleration in that place), the phase in the vibration cycle becomes unidentifiable. In such a case, instead of the phase, the correction calculation unit 40D is notified of the fact that the vehicle A is accelerating/decelerating at that very moment.

Even in this case, the correction calculation unit 40D can estimate the rate of variation by having acquired beforehand the vibration states at acceleration/deceleration in various ways (i.e., the vibration waveform). It is, however, allowable for the accelerometer 31 to output only the fact that the vehicle A is accelerating/decelerating at that very moment.

Then, the correction calculation unit 40D distinguishes, by use of the acquired vehicle ID, the particular one vehicle A from both the preceding vehicles and the following vehicles, and thus acquires the corrected axle loads for all the individual ones of the plurality of axles that the vehicle A has.

Hence, because the entry-side vehicle detector 90 does not have to detect the passing of the particular one vehicle A, the charging system 1 of a modified example may include no entry-side vehicle detector 90.

Charging-Communication Processing Device

Detailed description will be provided below about some components of the charging-communication processing device 50 and their functions.

The axle-load-information calculation unit 51B is configured to acquire the corrected axle loads of all the axles of the vehicle A through the axle-load-information acquisition unit 51A.

The axle-load-information calculation unit 51B is configured to calculate a representative value of the all the acquired corrected axle loads of the all the individual axles of the vehicle A. In a case of the present embodiment, the axle-load-information calculation unit 51B is configured to calculate the greatest value as the representative value, and then notify the toll determination unit 51C of the greatest value thus calculated.

As a modified example, the axle-load-information calculation unit 51B may be configured to calculate, as the representative value, values such as the average value, or the center value.

The toll determination unit 51C is configured to determine the toll for the vehicle A by use of the representative value that has been notified of.

The representative value of the corrected axle loads of all the individual axles of a particular vehicle may be used in the comparison of the impact that the vehicle can have on the road damage with the corresponding impacts of any other vehicles. Specifically, even in a case where more than one vehicle have the same total weight, a vehicle with a larger greatest value, a larger average value, or the like of the corrected axle loads has a larger impact on the road damage than a vehicle with a smaller greatest value, a smaller average value, or the like of the corrected axle loads. By calculating the toll for each vehicle by use of a representative value of the corrected axle loads of all the axles of the vehicle, the charging-communication processing device 50 can charge a toll on the vehicle in accordance with the magnitude of the impact that the vehicle has on the road damage at least in a relative terms to other vehicles.

As a modified example, the axle-load-information calculation unit 51B may calculate the sum (total amount) of all the corrected axle loads of the vehicle A. In such a case, the axle-load-information calculation unit 51B is configured to notify the toll determination unit 51C of the calculated sum of all the corrected axle loads of the vehicle A to allow the toll determination unit 51C to determine a toll associated with the sum of all the corrected axle loads of the vehicle A.

By determining a toll associated with the sum of all the corrected axle loads of the vehicle A, the toll to be charged can be associated with the total weight of the vehicle A. As the magnitude of the impact given by each vehicle to the road damage is associated with the total weight of all the individual axles, a toll can be charged on the vehicle in accordance with the magnitude of the impact given by the vehicle to the road damage.

As another modified example, the axle-load-information calculation unit 51B may be configured to not only acquire all the corrected axle loads of the vehicle A but also acquire, through the communication antenna 80, the numbers of wheels for the individual axles. In such a case, the axle-load-information calculation unit 51B is configured to calculate the wheel loads (the loads of individual wheels) by dividing each of the corrected axle loads by the number of wheels of the corresponding wheel. In addition, the axle-load-information calculation unit 51B is configured to calculate a representative value (e.g., the greatest value, the average value, etc.) of the acquired wheel loads of all the individual wheels of the vehicle A, and then to notify the toll determination unit 51C of the representative value thus calculated. The toll determination unit 51C is configured to determine the toll for the vehicle A by use of the representative value that has been notified of.

For example, in a case where more than one vehicles have the same axle loads, a vehicle with fewer wheels on each axle has a larger local load while a vehicle with more wheels on each axle has a smaller local load. Hence, by charging a toll based on a representative value such as the greatest value and the average value, of all the wheel loads of each vehicle, tolls can be charged on individual vehicles in accordance with the magnitude of the impact that each of the wheels of the individual vehicles has on the road damage.

Charging Method

An embodiment of a charging method according to the present invention will be described below by use of the charging system 1 and the onboard system 10.

Figure 6:
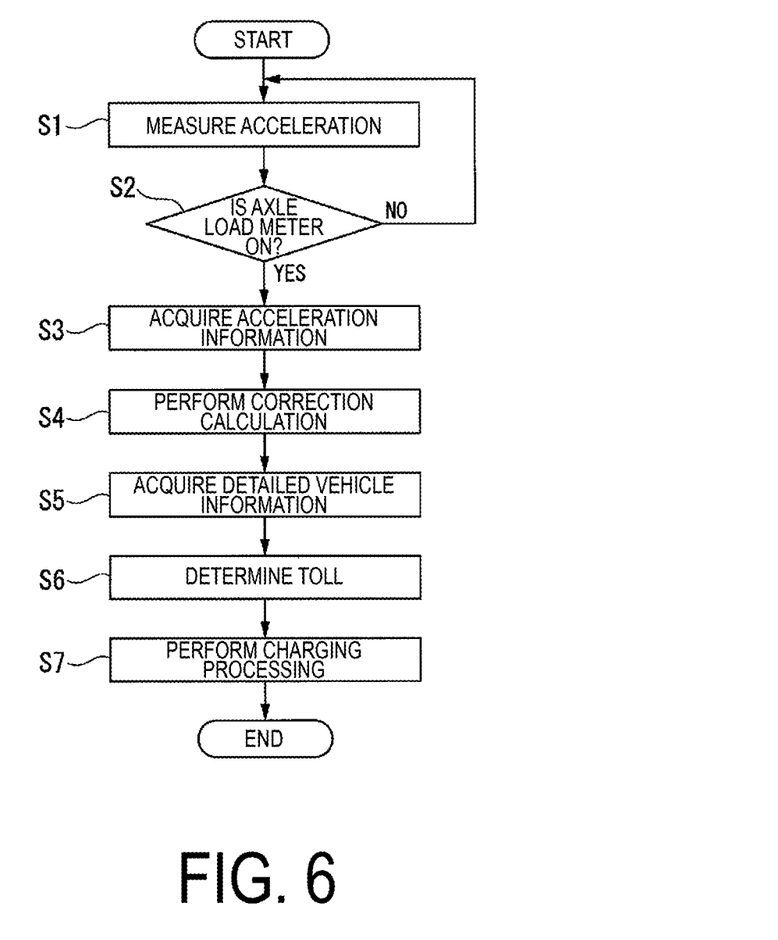
FIG. 6 is a flowchart of the first embodiment of the present invention.

As illustrated in FIG. 6, the accelerometer 31 constantly measures the vertical-direction acceleration (S1: acceleration measurement step). The axle load meter 60 measures the axle load of each axle of the vehicle A (S2: axle load measurement step). In a case where the vehicle A that has entered an area covered by the charging system 1 travels on the axle load meter 60 and thus the axle load meter 60 detects a load (S2: YES), the roadside wireless communication device 40 acquires the acceleration information from one of the plurality of onboard wireless communication devices 30 of the vehicle A, the one being disposed near the axle associated with the measured axle load (S3: acceleration information acquisition step). In a case where the axle load meter 60 detects no axle load (S2: NO), the accelerometer 31 continues to measure the vertical-direction acceleration constantly. Next, based on the acceleration information, the roadside wireless communication device 40 corrects the measurement result obtained by the axle load meter 60 for each axle, and thus calculates the corrected axle load for each axle (S4: correction calculation step). Next, the communication antenna 80 acquires the information on the vehicle details from the onboard unit 20 (S5: detailed vehicle information acquisition step). Finally, based on the corrected axle loads of all the individual axles, the toll determination unit 51C determines the toll for the vehicle A (S6: toll determination step). After that, the charging system 1 performs a charge processing (S7: charge processing step), transmits the charge processing result to the onboard unit 20 of the vehicle A, and outputs the acquired information, the charge processing result, and the like to the central payment-processing device 70 (host device).

Operational Effects

Some operational effects of the present embodiment will be described below.

In the present embodiment, the charging system 1 determines the toll based on the axle load measurement results of the individual axles. Accordingly, in a case where more than one vehicle with the same total weight have different numbers of axles or have different load balances between their front and rear axles, different tolls can be charged on the vehicles.

In addition, the charging system 1 corrects the axle loads by use of the vertical accelerations of the corresponding axles. Hence, the charging system 1 can determine the toll of each vehicle based on the axle-load measurement result with reduced influence of the vertical acceleration derived from the acceleration, the vibrations, and the like of the traveling vehicle.

In addition, the charging system 1 acquires the acceleration information every time an axle-load measurement is performed. Hence, the charging system 1 can acquire the acceleration information corresponding, on a one-to-one basis, to each of the axles subjected to the measurement.

In addition, the charging system 1 can charge, on each vehicle, a toll associated with the representative value of the corrected axle loads of all the axles of the vehicle. As the magnitude of the impact given by each vehicle to the road damage is associated with the representative value of the vehicle (including its load), the charging system can charge a toll on each vehicle in accordance with the magnitude of the impact given by the vehicle to the road damage. In particular, by determining a toll that is associated with the greatest value of all the corrected axle loads of each vehicle, even if more than one vehicles have the same total weight, a toll that is associated with the local maximum axle load of each of such vehicles can be charged on each vehicle.

In addition, by determining a toll that is associated with the average value of all the corrected axle loads of each vehicle, even if more than one vehicle have the same total weight, a toll that is associated with the number of the axles of each of such vehicles can be charged on each vehicle.

Though the charging system 1 of the present embodiment is a separate lane type where some components of the charging system 1 are installed in the islands I, the present invention may be applied to a charging system of a free flow type as a modified example.

Second Embodiment

A second embodiment of a charging system and an onboard system of the present invention will be described below with reference to FIG. 7 and FIG. 8.

The charging system of the present embodiment is basically identical with the charging system of the first embodiment, but is different from the latter in that the former employs an automated toll collection machine in place of the charging-communication processing device. Detailed description will be given below about the difference.

Figure 7:
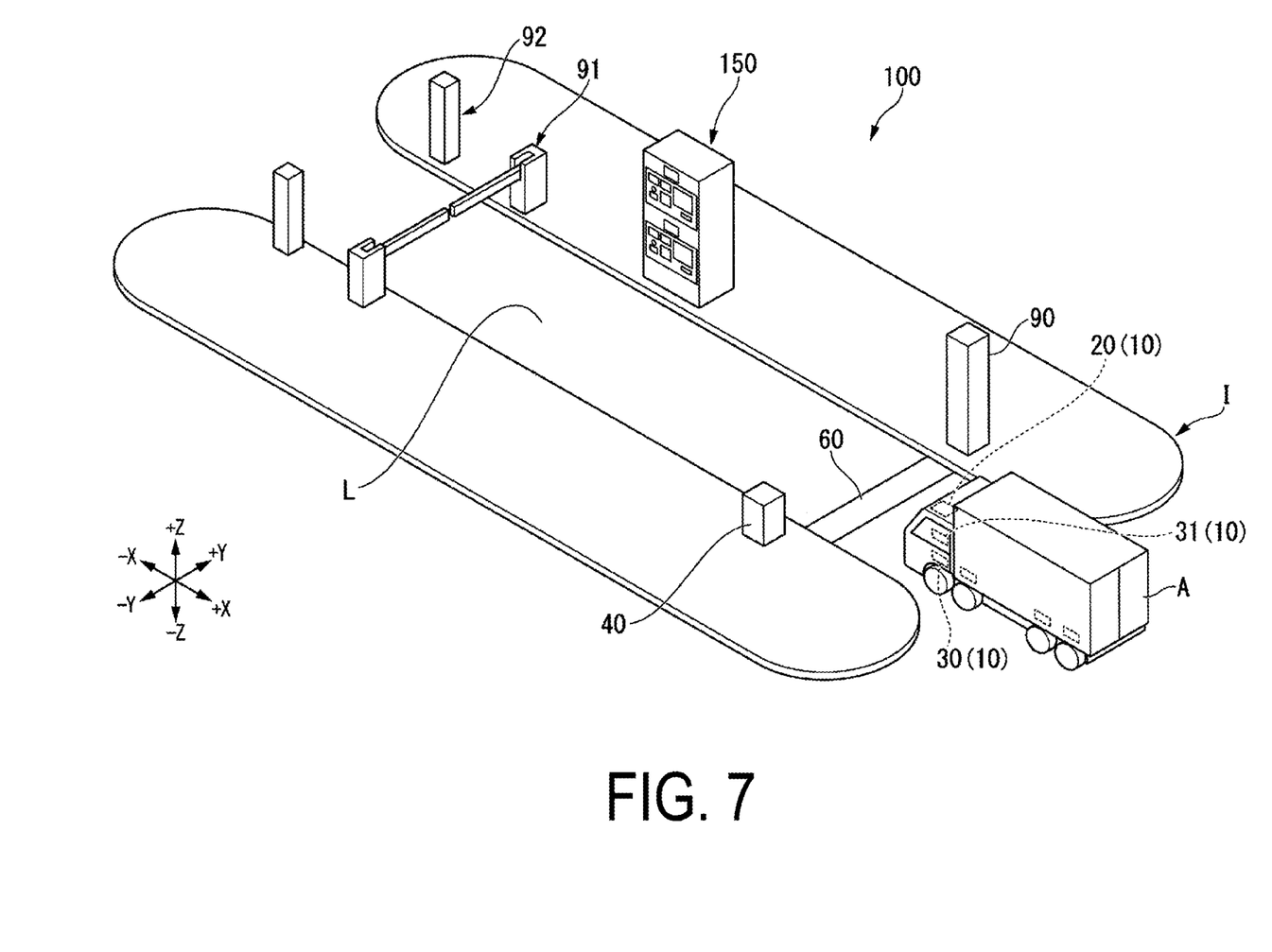
FIG. 7 is a schematic diagram of a second embodiment of the present invention.
Figure 8:
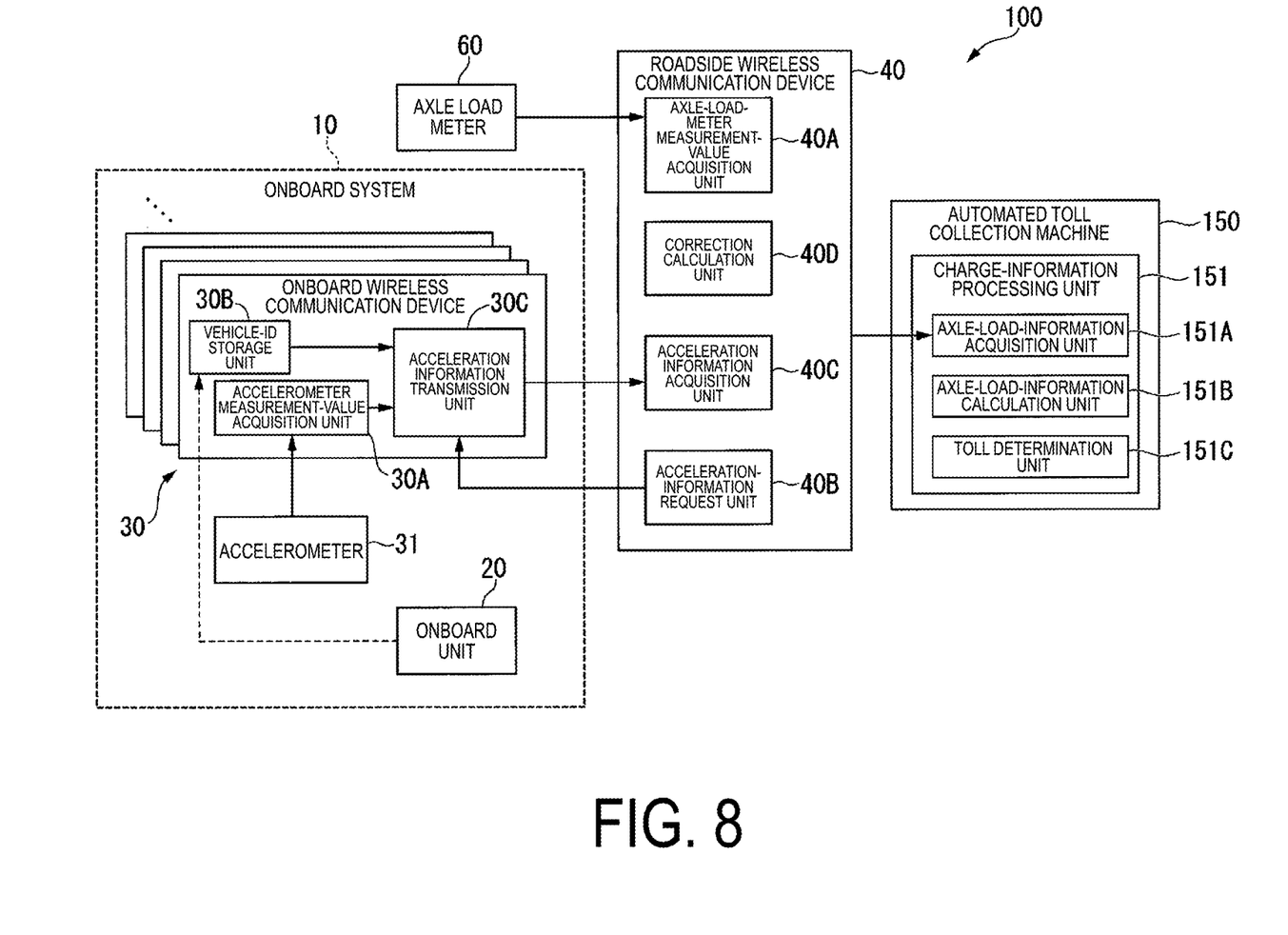
FIG. 8 is a block diagram of the second embodiment of the present invention.

As illustrated in FIG. 7 and FIG. 8, a charging system 100 includes an automated toll collection machine 150. The automated toll collection machine 150 is a machine configured to perform a toll collection processing by showing, among other things, the charged amount of toll to the driver or the like (user) of the vehicle A traveling on the lane L. Provided on the front side (the side facing the lane L) of the automated toll collection machine 150 are, among other things, a display device configured to show the charged amount of toll and a payment acceptance port to accept bills and/or coins, credit cards, or the like.

The automated toll collection machine 150 is disposed on the island I at a position on the downstream side of the axle load meter 60 and the roadside wireless communication device 40, and is configured to charge the amount of toll associated with the vehicle A.

The automated toll collection machine 150 includes a charge-information processing unit 151. The charge-information processing unit 151 includes an axle-load-information acquisition unit 151A, an axle-load-information calculation unit 151B, and a toll determination unit 151C. Thus, the charge-information processing unit 151 is configured to function in a similar manner to its counterpart in the first embodiment.

As the charging system 100 of the present embodiment does not have to include the onboard unit 20 of the onboard system 10, the onboard system 10 of a modified example of the present embodiment may include no onboard unit 20.

In the embodiments described above, the various processes are implemented by a program for achieving the various functions of the charge-information processing unit and the roadside wireless communication device of the charging system. The program is recorded on a computer-readable recording medium, and the program recorded on the recording medium is read and executed by a computer system. Various process steps of the above-described each CPU are stored on a computer-readable recording medium in the form of a program, and the computer reads and executes the program to implement the various processes. Examples of the computer-readable recording medium include, among other things, magnetic disks, magneto-optical disks, CD-ROMs, DVD-ROMs, and semiconductor memories. This computer program may be distributed to the computer on a communication line, and the computer that receives this distribution may execute the program.

In addition, in an allowable implementation, various functions of the charge-information processing unit and the roadside wireless communication device of the charging system may be provided by a plurality of devices connected by a network.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

For example, the present embodiment relates to a toll charging system for a toll road, but the present invention may be applied to a parking-fee charging system for a parking lot.

Though the axle load meter of the present embodiment is buried in the road surface of the lane L, an axle load meter of a modified example may be buried in a footplate, a footplate frame, or the like that has already been buried in the road surface of the lane L.

INDUSTRIAL APPLICABILITY

The charging system of the present invention acquires the result of an axle-load measurement with reduced influence of the acceleration, the vibrations, and the like of the traveling vehicle.

The invention claimed is:

1. A charging system comprising:
an axle load meter disposed on a lane and configured to measure an axle load of each of a plurality of axles of a vehicle traveling on the axle load meter;
an acceleration information acquisition unit configured to acquire, from the vehicle, vertical-direction acceleration information associated with each of the plurality of axles;
a correction calculation unit configured to correct, based on the acceleration information, a measurement result for each of the plurality of axles obtained by the axle load meter and thus to calculate a corrected axle load for each of the plurality of axles;
an axle-load-information calculation unit configured to calculate a greatest value of the corrected axle load for each of the plurality of axles; and
a toll determination unit configured to determine a toll for the vehicle based on the calculated greatest value.

2. The charging system according to claim 1, further comprising:
an acceleration-information request unit configured to transmit, to the vehicle, a request signal for the acceleration information in response to acquisition of the measurement result obtained by the axle load meter,
wherein the acceleration information acquisition unit is configured to acquire the acceleration information provided by the vehicle in response to the request signal.

3. A charging method comprising the steps of:
measuring, by means of an axle load meter disposed on a lane, an axle load of each of a plurality of axles of a vehicle traveling on the axle load meter;
acquiring, from the vehicle, vertical-direction acceleration information associated with each of the plurality of axles;
calculating a corrected axle load for each of the plurality of axles by correcting, based on the vertical-direction acceleration information, a measurement result for each of the plurality of axles obtained by the axle load meter;
calculating a greatest value of the corrected axle load for each of the plurality of axles; and
determining a toll for the vehicle based on the calculated greatest value.

* * * * *